United States Patent
Lechner et al.

[11] 3,773,403
[45] Nov. 20, 1973

[54] SIX COMPONENT INVERTED TELEPHOTO PROJECTION LENS

[75] Inventors: Hadrian B. Lechner, North Chili; Lynn L. Van Orden, Holley, both of N.Y.

[73] Assignee: Bausch & Lomb Incorporated, Rochester, N.Y.

[22] Filed: Sept. 5, 1972

[21] Appl. No.: 286,489

[52] U.S. Cl. .............................................. 350/215
[51] Int. Cl. ............................................... G02b 9/62
[58] Field of Search .............................. 350/214, 215

[56] References Cited
UNITED STATES PATENTS 3,064,533  11/1962  Hudson................................. 350/214
3,468,600  9/1969  Hugues............................. 350/215 X

*Primary Examiner*—John K. Corbin
*Attorney*—Frank C. Parker et al.

[57] ABSTRACT

A six component $f/2.4$ inverted telephoto projection or camera lens has seven elements, of which the second and third are a doublet. The first five components form a positive group and are widely separated from a thick negative singlet. Four examples are disclosed. The lens has a magnification ratio of 1:75.

5 Claims, 1 Drawing Figure

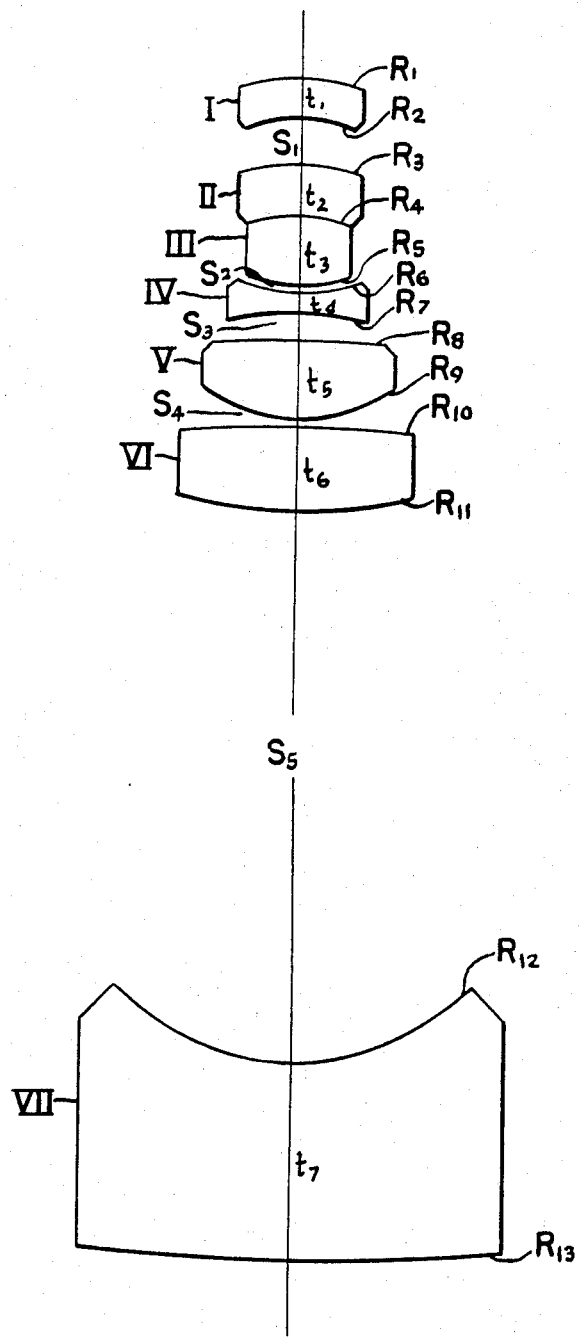

SIX COMPONENT INVERTED TELEPHOTO PROJECTION LENS

BACKGROUND

1. Field of the Invention

The invention is a six-component lens design.

2. Description of the Prior Art:

While no previous design is known which is substantially that of the instant design family, projection or camera lenses having thick negative singlets or doublets widely separated from positive groups and comprising six or seven components were disclosed in the U.S. Pat. Nos. 2,317,790, 2,612,077, 3,030,860 and 3,064,533.

SUMMARY OF THE INVENTION

The lens elements are assembled symmetrically about an optical axis from a short conjugate toward a long conjugate. The aperture is $f/2.4$ and the magnification ratio is 1:75.

The front lens I on the short conjugate side is a negative meniscus concave toward the long conjugate. It is airspaced from a doublet comprising a meniscus, usually negative, lens II in surface contact with a biconvex lens III. Lens IV is a biconcave element narrowly airspaced from lens III. Lenses V and VI are both biconvex and all the lenses I-VI are grouped relatively closely to constitute a positive group such as is characteristic of inverted telephoto lenses.

A long space, generally 2 ½ to 3 times the overall focal length, separates the positive group from a relatively thick negative meniscus lens VII concave toward the short conjugate, and which constitutes the negative portion characteristic of this class of lenses.

EXAMPLES

Four examples of the lens in question are set forth by their construction data appearing in the table below. All distances are given in ratio to a desired focal length $f$, taken as unity. The radii, R, taken as negative when centered on the short conjugate side, thicknesses, $t$, and spaces, $s$, are subnumerated in increasing order toward the long conjugate. The glass types are given by their refractive indices, *D, and dispersion values, $v$, according to the Fraunhofer analysis, and are similarly subnumerated toward the long conjugate.

|  |  |  |  |  |
|---|---|---|---|---|
| $R_1$ | 1.263f | 1.255f | 1.319f | 1.325f |
| $R_2$ | 0.545f | 0.556f | 0.588f | 0.562f |
| $R_3$ | 1.120f | 1.089f | 1.115f | 1.035f |
| $R_4$ | 0.706f | 0.704f | 0.706f | 0.706f |
| $-R_5$ | 0.956f | 0.959f | 0.927f | 0.923f |
| $-R_6$ | 0.757f | 0.741f | 0.708f | 0.712f |
| $R_7$ | 1.979f | 1.961f | 1.882f | 1.798f |
| $R_8$ | 10.926f | 10.768f | 7.336f | 7.035f |
| $-R_9$ | 0.862f | 0.863f | 0.886f | 0.874f |
| $R_{10}$ | 9.192f | 8.111f | 6.053f | 6.303f |
| $-R_{11}$ | 2.613f | 2.615f | 2.472f | 2.445f |
| $-R_{12}$ | 1.360f | 1.333f | 1.131f | 1.160f |
| $-R_{13}$ | 8.438f | 9.782f | 8.975f | 9.168f |
| $t_1$ | 0.174f | 0.174f | 0.174f | 0.174f |
| $t_2$ | 0.261f | 0.261f | 0.261f | 0.261f |
| $t_3$ | 0.349f | 0.349f | 0.349f | 0.349f |
| $t_4$ | 0.087f | 0.087f | 0.087f | 0.087f |
| $t_5$ | 0.392f | 0.394f | 0.404f | 0.397f |
| $t_6$ | 0.437f | 0.437f | 0.437f | 0.437f |
| $t_7$ | 0.793f | 0.999f | 1.350f | 1.381f |
| $s_1$ | 0.223f | 0.225f | 0.234f | 0.217f |
| $s_2$ | 0.044f | 0.046f | 0.044f | 0.046f |
| $s_3$ | 0.122f | 0.122f | 0.122f | 0.122f |
| $s_4$ | 0.017f | 0.017f | 0.017f | 0.017f |
| $s_5$ | 2.923f | 2.791f | 2.413f | 2.411f |
| *D1 | 1.523 | 1.523 | 1.523 | 1.523 |
| *D2 | 1.639 | 1.639 | 1.639 | 1.639 |
| *D3 | 1.639 | 1.639 | 1.639 | 1.639 |
| *D4 | 1.720 | 1.720 | 1.720 | 1.720 |
| *D5 | 1.639 | 1.639 | 1.639 | 1.639 |
| *D6 | 1.640 | 1.640 | 1.640 | 1.640 |
| *D7 | 1.673 | 1.673 | 1.673 | 1.673 |
| $v_1$ | 58.4 | 58.4 | 58.4 | 58.4 |
| $v_2$ | 55.3 | 55.3 | 55.3 | 55.3 |
| $v_3$ | 55.3 | 55.3 | 55.3 | 55.3 |
| $v_4$ | 29.3 | 29.3 | 29.3 | 29.3 |
| $v_5$ | 55.3 | 55.3 | 55.3 | 55.3 |
| $v_6$ | 34.4 | 34.4 | 34.4 | 34.4 |
| $v_7$ | 32.1 | 32.1 | 32.1 | 32.1 |

Those skilled in the art will appreciate that minor variations from these values may still be compensated for by various well known alignment and assembly techniques to provide lenses having commercial potential but which may not exhibit the excellent performance levels attributed to the precise designs disclosed. In particular it is thought that the refractive indices may vary as much as 0.002 and the dispersion values by as much as 2.0 without departing unduly from the basic design family.

We claim:

1. An inverse telephoto lens comprising seven elements of which the second and third are in surface contact, said lens being described by construction data comprising radii, R, taken as negative when centered on the short conjugate side, thicknesses, $t$, and spaces, $s$, all given as ratios of the overall focal length, $f$, and further comprising glass types of refractive index, *D, and dispersion values, $v$, all of said data being subnumerated in increasing order toward the long conjugate, said data being particularized substantially within the ranges set forth below:

| | | | | |
|---|---|---|---|---|
| 1.255f | $\leq$ | $R_1$ | $\leq$ | 1.325f |
| 0.545f | $\leq$ | $R_2$ | $\leq$ | 0.587f |
| 1.035f | $\leq$ | $R_3$ | $\leq$ | 1.120f |
| 0.704f | $\leq$ | $R_4$ | $\leq$ | 0.706f |
| 0.923f | $\leq$ | $-R_5$ | $\leq$ | 0.959f |
| 0.708f | $\leq$ | $-R_6$ | $\leq$ | 0.757f |
| 1.798f | $\leq$ | $R_7$ | $\leq$ | 1.979f |
| 7.035f | $\leq$ | $R_8$ | $\leq$ | 10.926f |
| 0.862f | $\leq$ | $-R_9$ | $\leq$ | 0.886f |
| 6.053f | $\leq$ | $R_{10}$ | $\leq$ | 9.192f |
| 2.445f | $\leq$ | $-R_{11}$ | $\leq$ | 2.615f |
| 1.131f | $\leq$ | $-R_{12}$ | $\leq$ | 1.360f |
| 8.438f | $\leq$ | $-R_{13}$ | $\leq$ | 9.782f |
| 0.173f | $\leq$ | $t_1$ | $\leq$ | 0.175f |
| 0.260f | $\leq$ | $t_2$ | $\leq$ | 0.262f |
| 0.348f | $\leq$ | $t_3$ | $\leq$ | 0.350f |
| 0.086f | $\leq$ | $t_4$ | $\leq$ | 0.088f |
| 0.392f | $\leq$ | $t_5$ | $\leq$ | 0.404f |
| 0.436f | $\leq$ | $t_6$ | $\leq$ | 0.438f |
| 0.793f | $\leq$ | $t_7$ | $\leq$ | 1.381f |
| 0.217f | $\leq$ | $s_1$ | $\leq$ | 0.234f |
| 0.044f | $\leq$ | $s_2$ | $\leq$ | 0.046f |
| 0.121f | $\leq$ | $s_3$ | $\leq$ | 0.123f |
| 0.016f | $\leq$ | $s_4$ | $\leq$ | 0.018f |
| 2.411f | $\leq$ | $s_5$ | $\leq$ | 2.923f |
| 1.521 | $\leq$ | *D1 | $\leq$ | 1.525 |
| 1.637 | $\leq$ | *D2 | $\leq$ | 1.641 |
| 1.637 | $\leq$ | *D3 | $\leq$ | 1.641 |
| 1.718 | $\leq$ | *D4 | $\leq$ | 1.722 |
| 1.637 | $\leq$ | *D5 | $\leq$ | 1.641 |
| 1.638 | $\leq$ | *D6 | $\leq$ | 1.642 |
| 1.671 | $\leq$ | *D7 | $\leq$ | 1.675 |
| 56.4 | $\leq$ | $v_1$ | $\leq$ | 60.4 |
| 53.3 | $\leq$ | $v_2$ | $\leq$ | 57.3 |
| 53.3 | $\leq$ | $v_3$ | $\leq$ | 57.3 |
| 27.3 | $\leq$ | $v_4$ | $\leq$ | 31.3 |
| 53.3 | $\leq$ | $v_5$ | $\leq$ | 57.3 |
| 32.4 | $\leq$ | $v_6$ | $\leq$ | 36.4 |
| 30.1 | $\leq$ | $v_7$ | $\leq$ | 34.1 |

2. The lens of claim 1 having construction data substantially as follows:

| | | | |
|---|---|---|---|
| $R_1$ | 1.263f | $R_8$ | 10.926f |
| $R_2$ | 0.545f | $-R_9$ | 0.862f |
| $R_3$ | 1.120f | $R_{10}$ | 9.192f |
| $R_4$ | 0.706f | $-R_{11}$ | 2.613f |
| $-R_5$ | 0.956f | $-R_{12}$ | 1.360f |
| $-R_6$ | 0.757f | $-R_{13}$ | 8.438f |
| $R_7$ | 1.979f | | |
| $t_1$ | 0.174f | $t_7$ | 0.793f |
| $t_2$ | 0.261f | $s_1$ | 0.223f |
| $t_3$ | 0.349f | $s_2$ | 0.044f |
| $t_4$ | 0.087f | $s_3$ | 0.122f |
| $t_5$ | 0.392f | $s_4$ | 0.017f |
| $t_6$ | 0.437f | $s_5$ | 2.923f |
| *D1 | 1.523 | $v_1$ | 58.4 |
| *D2 | 1.639 | $v_2$ | 55.3 |
| *D3 | 1.639 | $v_3$ | 55.3 |
| *D4 | 1.720 | $v_4$ | 29.3 |
| *D5 | 1.639 | $v_5$ | 55.3 |
| *D6 | 1.640 | $v_6$ | 34.4 |
| *D7 | 1.673 | $v_7$ | 32.1 |

3. The lens of claim 1 having construction data substantially as follows:

| | | | |
|---|---|---|---|
| $R_1$ | 1.255f | $R_8$ | 10.768f |
| $R_2$ | 0.556f | $-R_9$ | 0.863f |
| $R_3$ | 1.089f | $R_{10}$ | 8.111f |
| $R_4$ | 0.704f | $-R_{11}$ | 2.615f |
| $-R_5$ | 0.959f | $-R_{12}$ | 1.333f |
| $-R_6$ | 0.741f | $-R_{13}$ | 9.782f |
| $R_7$ | 1.961f | | |
| $t_1$ | 0.174f | $t_7$ | 0.999f |
| $t_2$ | 0.261f | $s_1$ | 0.225f |
| $t_3$ | 0.349f | $s_2$ | 0.046f |
| $t_4$ | 0.087f | $s_3$ | 0.122f |
| $t_5$ | 0.394f | $s_4$ | 0.017f |
| $t_6$ | 0.437f | $s_5$ | 2.791f |
| *D1 | 1.523 | $v_1$ | 58.4 |
| *D2 | 1.639 | $v_2$ | 55.3 |
| *D3 | 1.639 | $v_3$ | 55.3 |
| *D4 | 1.720 | $v_4$ | 29.3 |
| *D5 | 1.639 | $v_5$ | 55.3 |
| *D6 | 1.640 | $v_6$ | 34.4 |
| *D7 | 1.673 | $v_7$ | 32.1 |

4. The lens of claim 1 having construction data substantially as follows:

| | | | |
|---|---|---|---|
| $R_1$ | 1.319f | $R_8$ | 7.336f |
| $R_2$ | 0.588f | $-R_9$ | 0.886f |
| $R_3$ | 1.115f | $R_{10}$ | 6.053f |
| $R_4$ | 0.706f | $-R_{11}$ | 2.472f |
| $-R_5$ | 0.927f | $-R_{12}$ | 1.131f |
| $-R_6$ | 0.708f | $-R_{13}$ | 8.975f |
| $R_7$ | 1.882f | | |
| $t_1$ | 0.174f | $t_7$ | 1.350f |
| $t_2$ | 0.261f | $s_1$ | 0.234f |
| $t_3$ | 0.349f | $s_2$ | 0.044f |
| $t_4$ | 0.087f | $s_3$ | 0.122f |
| $t_5$ | 0.404f | $s_4$ | 0.017f |
| $t_6$ | 0.437f | $s_5$ | 2.413f |
| *D1 | 1.523 | $v_1$ | 58.4 |
| *D2 | 1.639 | $v_2$ | 55.3 |
| *D3 | 1.639 | $v_3$ | 55.3 |
| *D4 | 1.720 | $v_4$ | 29.3 |
| *D5 | 1.639 | $v_5$ | 55.3 |
| *D6 | 1.640 | $v_6$ | 34.4 |
| *D7 | 1.673 | $v_7$ | 32.1 |

5. The lens of claim 1 having construction data substantially as follows:

| | | | |
|---|---|---|---|
| $R_1$ | 1.325f | $R_8$ | 7.035f |
| $R_2$ | 0.562f | $-R_9$ | 0.874f |
| $R_3$ | 1.035f | $R_{10}$ | 6.303f |
| $R_4$ | 0.706f | $-R_{11}$ | 2.445f |
| $-R_5$ | 0.923f | $-R_{12}$ | 1.160f |
| $-R_6$ | 0.712f | $-R_{13}$ | 9.168f |
| $R_7$ | 1.798f | | |
| $t_1$ | 0.174f | $t_7$ | 1.381f |
| $t_2$ | 0.261f | $s_1$ | 0.217f |
| $t_3$ | 0.349f | $s_2$ | 0.046f |
| $t_4$ | 0.087f | $s_3$ | 0.122f |
| $t_5$ | 0.397f | $s_4$ | 0.017f |
| $t_6$ | 0.437f | $s_5$ | 2.411f |
| *D1 | 1.523 | $v_1$ | 58.4 |
| *D2 | 1.639 | $v_2$ | 55.3 |
| *D3 | 1.639 | $v_3$ | 55.3 |
| *D4 | 1.720 | $v_4$ | 29.3 |
| *D5 | 1.639 | $v_5$ | 55.3 |
| *D6 | 1.640 | $v_6$ | 34.4 |
| *D7 | 1.673 | $v_7$ | 32.1 |

* * * * *